US009525737B2

(12) United States Patent
Friedman

(10) Patent No.: US 9,525,737 B2
(45) Date of Patent: Dec. 20, 2016

(54) LOCKLESS DISTRIBUTED REDUNDANT STORAGE AND NVRAM CACHE IN A HIGHLY-DISTRIBUTED SHARED TOPOLOGY WITH DIRECT MEMORY ACCESS CAPABLE INTERCONNECT

(71) Applicant: E8 Storage Systems Ltd., Ramat Gan (IL)

(72) Inventor: Alex Friedman, Hadera (IL)

(73) Assignee: E8 STORAGE SYSTEMS LTD., Ramat Gan (IL)

( * ) Notice: Subject to any disclaimer, the term of this patent is extended or adjusted under 35 U.S.C. 154(b) by 0 days.

(21) Appl. No.: 15/015,157

(22) Filed: Feb. 4, 2016

(65) Prior Publication Data

US 2016/0308968 A1 Oct. 20, 2016

Related U.S. Application Data

(60) Provisional application No. 62/146,984, filed on Apr. 14, 2015.

(51) Int. Cl.
*G06F 15/16* (2006.01)
*H04L 29/08* (2006.01)
(Continued)

(52) U.S. Cl.
CPC ....... *H04L 67/1097* (2013.01); *G06F 12/0813* (2013.01); *G06F 17/30867* (2013.01); *H04L 29/08072* (2013.01); *G06F 2212/154* (2013.01)

(58) Field of Classification Search
USPC .............. 709/203, 217–218, 223–229, 250
See application file for complete search history.

(56) References Cited

U.S. PATENT DOCUMENTS 6,446,220 B1   9/2002  Menon
8,095,763 B2 *  1/2012  Piszczek ............. G06F 11/1076
                                                 711/114

(Continued)

FOREIGN PATENT DOCUMENTS

WO   2013024485 A2   2/2013

OTHER PUBLICATIONS

Kalia et al., "Using RDMA Efficiently for Key-Value Services", Proceedings of the 2014 ACM conference on SIGCOMM, 15 pages, Aug. 17-22, 2014.

(Continued)

*Primary Examiner* — Zarni Maung
(74) *Attorney, Agent, or Firm* — D. Kliger IP Services Ltd.

(57) ABSTRACT

A method for data storage includes, in a system that includes multiple servers and multiple multi-queue storage devices that communicate over a network, accumulating data blocks by a server in a Non-Volatile Random-Access Memory (NVRAM) cache that is accessible to the servers and to the storage devices, by sending the data blocks from the server to the NVRAM cache using remote direct memory access, so as to form one or more stripes. The stripes are transferred from the NVRAM cache to respective server-specific queues on the storage devices. Another server is prevented from causing inconsistency in the data blocks, by querying a data structure, which is shared and modified by the servers using remote direct memory access, and which specifies storage locations of the data blocks.

25 Claims, 5 Drawing Sheets

(51) Int. Cl.
*G06F 12/08* (2016.01)
*G06F 17/30* (2006.01)
*G06F 12/00* (2006.01)

(56) References Cited

U.S. PATENT DOCUMENTS

| | | | |
|---|---|---|---|
| 8,510,265 B1 | 8/2013 | Boone et al. | |
| 8,595,385 B1 | 11/2013 | Shapiro et al. | |
| 8,725,934 B2 | 5/2014 | Batwara et al. | |
| 8,812,450 B1 | 8/2014 | Kesavan et al. | |
| 9,112,890 B1* | 8/2015 | Ori | G06F 3/06 |
| 9,164,689 B2* | 10/2015 | O'Brien | G06F 3/0611 |
| 9,251,052 B2 | 2/2016 | Talagala et al. | |
| 9,274,720 B1 | 3/2016 | Ori | |
| 2003/0028725 A1 | 2/2003 | Naberhuis et al. | |
| 2004/0153576 A1 | 8/2004 | Hansmann et al. | |
| 2005/0050273 A1 | 3/2005 | Horn et al. | |
| 2006/0031450 A1 | 2/2006 | Unrau et al. | |
| 2007/0168396 A1 | 7/2007 | Adams et al. | |
| 2010/0153617 A1 | 6/2010 | Miroshnichenko et al. | |
| 2010/0250831 A1* | 9/2010 | O'Brien | G06F 11/3433 711/103 |
| 2011/0060887 A1 | 3/2011 | Thatcher et al. | |
| 2011/0246720 A1* | 10/2011 | Nakamura | G06F 12/0813 711/119 |
| 2011/0296133 A1 | 12/2011 | Flynn et al. | |
| 2012/0079318 A1* | 3/2012 | Colgrove | G06F 3/0688 714/6.22 |
| 2012/0144110 A1 | 6/2012 | Smith | |
| 2012/0233396 A1 | 9/2012 | Flynn et al. | |
| 2013/0046949 A1 | 2/2013 | Colgrove et al. | |
| 2013/0179649 A1 | 7/2013 | Green et al. | |
| 2013/0198312 A1* | 8/2013 | Tamir | G06F 15/167 709/212 |
| 2013/0275447 A1 | 10/2013 | Ben-Tsion et al. | |
| 2014/0040411 A1* | 2/2014 | Weber | G06F 3/0607 709/212 |
| 2014/0136808 A1 | 5/2014 | Colgrove et al. | |
| 2014/0189032 A1 | 7/2014 | Sugimoto et al. | |
| 2014/0195849 A1 | 7/2014 | Parladori et al. | |
| 2014/0289462 A9 | 9/2014 | Malwankar | |
| 2015/0127923 A1 | 5/2015 | Miller et al. | |
| 2015/0212752 A1* | 7/2015 | Nemazie | G06F 12/0246 711/103 |
| 2016/0004642 A1* | 1/2016 | Sugimoto | G06F 3/06 711/128 |
| 2016/0034418 A1 | 2/2016 | Romem et al. | |
| 2016/0057224 A1* | 2/2016 | Ori | G06F 3/06 709/213 |
| 2016/0162209 A1 | 6/2016 | Calderone | |

OTHER PUBLICATIONS

U.S. Appl. No. 14/697,653, Office Action dated Jul. 17, 2015.
Friedman., U.S. Appl. No. 14/697,653, filed Apr. 28, 2015.
Ori., U.S. Appl. No. 14/997,600, filed Jan. 18, 2016.
Rodeh, O., "B-trees, Shadowing, and Clones", ACM Transactions on Storage, vol. 3, No. 4, article 15, 27 pages, Feb. 2008.
Rodeh, O., "B-trees, Shadowing, and Clones", 2007 Linux Storage & Filesystem Workshop, San Jose, USA, 51 pages, Feb. 12-13, 2007.
Rodeh et al., "BTRFS: The Linux B-Tree Filesystem", ACM Transactions on Storage, vol. 9, No. 3, article 9, 32 pages, Aug. 2013.
Lim et al., "SILT: A memory-efficient, high-performance key-value store", Proceedings of the 23rd ACM Symposium on Operating Systems Principles, 13 pages, year 2011.
Behringer et al., "Memory Management for Concurrent RDMA: A Design for a Key-Value Store", 86 pages, Jun. 3, 2014.
Mitchell et al., "Using One-Sided RDMA Reads to Build a Fast,CPU-Efficient Key-Value Store", USENIX Annual Technical Conference, pp. 103-114, Jun. 26-28, 2013.
Friedman et al., U.S. Appl. No. 15/086,102, filed Mar. 31, 2016.
U.S. Appl. No. 14/697,653, Office Action dated Dec. 31, 2015.
International Application No. PCT/IB2015/058842, Search Report dated Feb. 28, 2016.
NVM Express, Revision 1.2a, 209 pages, Oct. 23, 2015.
NVM Express, Revision 1.2, 205 pages, Nov. 3, 2014.
U.S. Appl. No. 14/697,653, Office Action dated May 3, 2016.
U.S. Appl. No. 14/997,600, Office Action dated Jun. 17, 2016.
U.S. Appl. No. 15/086,102, Office Action dated Jul. 28, 2016.
International Application # PCT/IB2016/051958 Search Report dated Aug. 2, 2016.

* cited by examiner

LOCKLESS DISTRIBUTED REDUNDANT STORAGE AND NVRAM CACHE IN A HIGHLY-DISTRIBUTED SHARED TOPOLOGY WITH DIRECT MEMORY ACCESS CAPABLE INTERCONNECT

CROSS-REFERENCE TO RELATED APPLICATIONS

This application claims the benefit of U.S. Provisional Patent Application 62/146,984, filed Apr. 14, 2015, whose disclosure is incorporated herein by reference.

FIELD OF THE INVENTION

The present invention relates generally to data storage, and particularly to methods and systems for distributed storage.

BACKGROUND OF THE INVENTION

Various techniques for distributed data storage are known in the art. For example, PCT International Publication WO 2013/024485, whose disclosure is incorporated herein by reference, describes a method of managing a distributed storage space, including mapping a plurality of replica sets to a plurality of storage managing modules installed in a plurality of computing units. Each of the plurality of storage managing modules manages access of at least one storage consumer application to replica data of at least one replica of a replica set from the plurality of replica sets. The replica data is stored in at least one drive of a respective computing unit.

U.S. Patent Application Publication 2015/0212752, whose disclosure is incorporated herein by reference, describes a storage system that includes a storage processor coupled to solid state disks (SSDs) and a host. The SSDs are identified by SSD logical block addresses (SLBAs). The storage processor receives a command from the host to write data to the SSDs and further receives a location within the SSDs to write the data, the location being referred to as a host LBA. The storage processor includes a central processor unit (CPU) subsystem and maintains unassigned SLBAs of a corresponding SSD. The CPU subsystem, upon receiving the command to write data, generates sub-commands based on a range of host LBAs derived from the received command and further based on a granularity. The CPU subsystem assigns the sub-commands to unassigned SLBAs by assigning each sub-command to a distinct SSD of a stripe, the host LBAs being decoupled from the SLBAs. The CPU subsystem continues to assign the sub-commands until all remaining SLBAs of the stripe are assigned, after which it calculates parity for the stripe and saves the calculated parity to one or more of the SSDs of the stripe.

SUMMARY OF THE INVENTION

An embodiment of the present invention that is described herein provides a method for data storage in a system that includes multiple servers and multiple multi-queue storage devices that communicate over a network. The method includes accumulating data blocks by a server in a Non-Volatile Random-Access Memory (NVRAM) cache that is accessible to the servers and to the storage devices, by sending the data blocks from the server to the NVRAM cache using remote direct memory access, so as to form one or more stripes. The stripes are transferred from the NVRAM cache to respective server-specific queues on the storage devices. Another server is prevented from causing inconsistency in the data blocks, by querying a data structure, which is shared and modified by the servers using remote direct memory access, and which specifies storage locations of the data blocks.

In some embodiments, accumulating the data blocks, transferring the stripes and preventing the inconsistency are performed without obtaining a lock on any of the data blocks.

In some embodiments, preventing the inconsistency includes: before writing a data block to the NVRAM cache, obtaining a storage location of the data block by making a first query to the shared data structure using remote direct memory readout; after writing the data block and before updating the shared data structure, making a second query to the shared data structure using remote direct memory readout, so as to re-obtain the storage location of the data block; and aborting writing of the data block if the storage location differs between the first and second queries. In a disclosed embodiment, making the second query and updating the shared data structure are performed jointly in an atomic compare-and-swap (CAS) remote direct memory access write command.

In some embodiments, preventing the inconsistency includes, after transferring at least part of a stripe from the NVRAM cache to the storage devices and before updating the shared data structure, verifying that the storage locations of one or more of the data blocks in the stripe did not change during transferal of the stripe. Verifying the storage locations and updating the shared data structure may be performed jointly in one or more atomic compare-and-swap (CAS) remote direct memory access write commands.

In an embodiment, the method further includes reading a data block from the NVRAM cache or from the storage devices, by: before reading the data block, making a first query to the shared data structure using remote direct memory readout, so as to obtain a storage location of the data block; after reading the data block, making a second query to the shared data structure using remote direct memory readout, so as to re-obtain the storage location of the data block; and outputting the read data block only if the storage location of the data block is unchanged between the first and second queries.

In another embodiment, the shared data structure is managed by at least one storage controller, and preventing the inconsistency is performed without executing code on a processor of the storage controller. In yet another embodiment, preventing the inconsistency is performed without direct communication among the servers. In still another embodiment, accumulating the data blocks and transferring the stripes include accumulating the data blocks until filling a predefined integer number of stripes, and then transferring the predefined integer number of stripes to the storage devices.

In some embodiments, at least part of the data structure is paged-out to the storage devices, and the method includes identifying the paged-out part, and a storage location thereof, by the servers using remote direct memory access, and then accessing the identified paged-out part on the storage devices. In an embodiment, the method includes read-caching in the NVRAM cache data that is read by the server from the storage devices.

There is additionally provided, in accordance with an embodiment of the present invention, a computing system including multiple multi-queue storage devices and multiple servers. The servers are configured to communicate with the storage devices over a network. A server among the servers is configured to accumulate data blocks in a Non-Volatile Random-Access Memory (NVRAM) cache that is accessible to the servers and to the storage devices, by sending the data blocks to the NVRAM cache using remote direct memory access, so as to form one or more stripes, to transfer the stripes from the NVRAM cache to respective server-specific queues on the storage devices, and to prevent another server from causing inconsistency in the data blocks, by querying a data structure, which is shared and modified by the servers using remote direct memory access, and which specifies storage locations of the data blocks.

There is further provided, in accordance with an embodiment of the present invention, a server in a system that includes multiple servers. The server includes a network interface for communicating over a network with multiple multi-queue storage devices, and a processor. The processor is configured to accumulate data blocks in a Non-Volatile Random-Access Memory (NVRAM) cache that is accessible to the servers and to the storage devices, by sending the data blocks to the NVRAM cache using remote direct memory access, so as to form one or more stripes, to transfer the stripes from the NVRAM cache to respective server-specific queues on the storage devices, and to prevent another server from causing inconsistency in the data blocks, by querying a data structure, which is shared and modified by the servers using remote direct memory access, and which specifies storage locations of the data blocks.

The present invention will be more fully understood from the following detailed description of the embodiments thereof, taken together with the drawings in which:

DETAILED DESCRIPTION OF EMBODIMENTS

Overview

Figure 1:
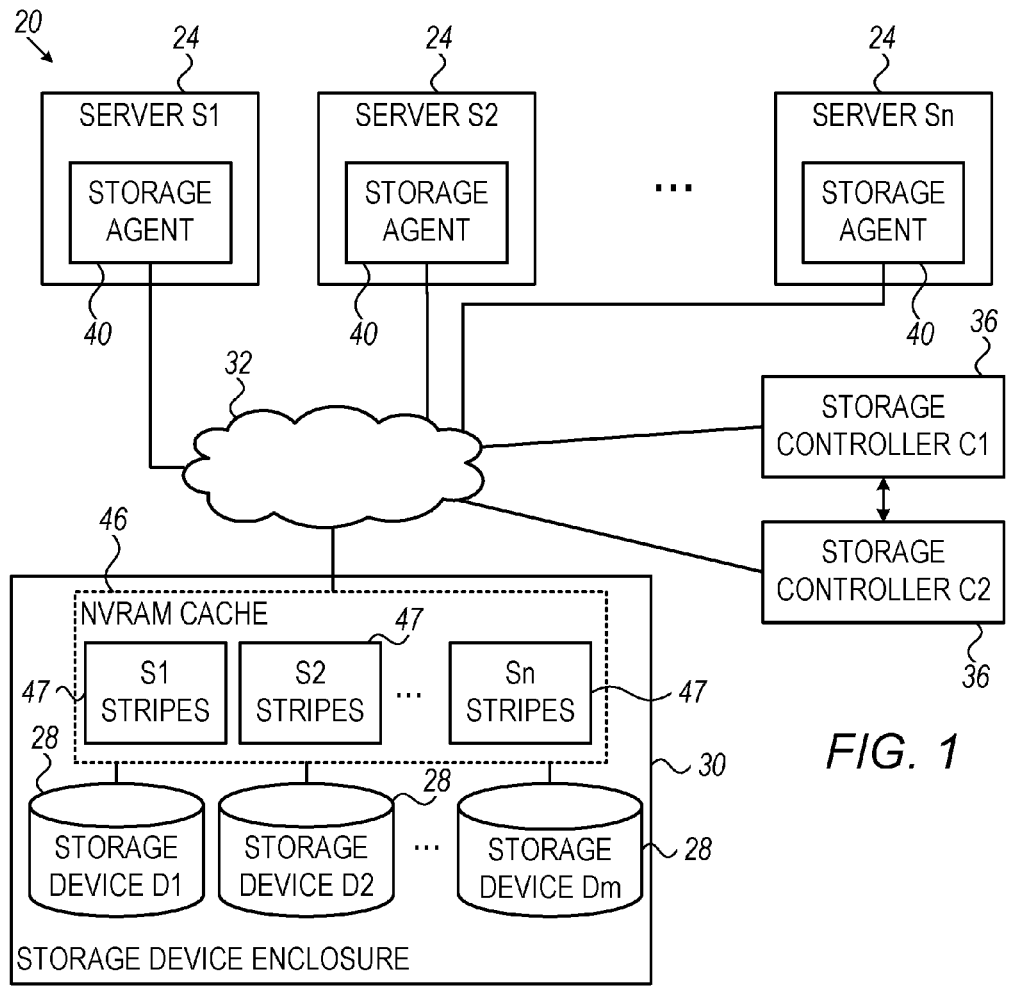
FIG. 1 is a block diagram that schematically illustrates a computing system that uses distributed data storage, in accordance with an embodiment of the present invention.

Embodiments of the present invention that are described herein provide improved methods and systems for implementing redundant storage, e.g., Redundant Array of Independent Disks (RAID), in a highly distributed manner. The high performance and high level of distribution are achieved, for example, by (i) using multi-queue storage devices and (ii) accessing shared data structures using remote direct memory access.

The disclosed techniques are typically implemented in a computing system comprising multiple servers that store data in multiple shared multi-queue storage devices, and one or more storage controllers. Computing systems of this sort are described, for example, in U.S. patent application Ser. Nos. 14/599,510 and 14/697,653, which are assigned to the assignee of the present patent application and whose disclosures are incorporated herein by reference.

In such a system, the storage devices are typically multi-queue storage devices, such as Solid State Drives (SSDs) that operate in accordance with the NVM Express (NVMe) specification. NVMe is specified, for example, in "NVM Express," Revision 1.2, Nov. 3, 2014, and revision 1.2a, Oct. 23, 2015, which are incorporated herein by reference. In these embodiments, each storage device provides multiple server-specific queues for storage commands, and has the freedom to queue, schedule and reorder execution of storage commands.

The servers typically store the data in stripes, each stripe comprising multiple data blocks and one or more redundancy (e.g., parity) blocks. In the disclosed embodiments, the system further comprises a Non-Volatile Random Access Memory (NVRAM) cache that is accessible to the servers and to the storage devices. Each server accumulates data blocks in the NVRAM cache, until filling a predefined integer number of stripes, and then transfers ("destages") the stripes to the server-specific queues on the storage devices. Each storage device then autonomously schedules and completes transfer of the data from the server-specific queues to the non-volatile storage medium. Destaging of full stripes is highly efficient in terms of parity calculations, and eliminates the need to read data blocks in order to update the parity for every write.

In some embodiments, the data blocks belong to user volumes that are shared among multiple servers. In order to prevent data inconsistency caused by different servers accessing the same data block or stripe, the system uses a set of shared data structures that specify the storage locations of the various data blocks and stripes.

The shared data structures are accessible both to the storage controllers and to the servers.

The disclosed techniques typically make extensive use of remote direct memory access over the communication network. Remote direct memory access is used, for example, by the servers for writing to the NVRAM cache, and for accessing the shared data structures that reside in the storage controllers' memory. The embodiments described below refer mainly to Remote Direct Memory Access (RDMA) protocols, by way of example. Various variants of RDMA may be used for this purpose, e.g., Infiniband (IB), RDMA over Converged Ethernet (RoCE), Virtual Interface Architecture and internet Wide Area RDMA Protocol (iWARP). Further alternatively, the disclosed techniques can be implemented using any other form of direct memory access over a network, e.g., Direct Memory Access (DMA), various Peripheral Component Interconnect Express (PCIe) schemes, or any other suitable protocol. In the context of the present patent application and in the claims, all such protocols are referred to as "remote direct memory access."

In this manner, the servers are able to query and update the shared data structures that reside in the memory of the storage controllers, without having to trigger or run code on the storage controllers. Similarly, the servers are able to write data to the NVRAM cache directly, without having to trigger or run code on the storage controllers or storage devices.

In various embodiments, the NVRAM cache and the shared data structures may be located at any suitable location in the system. The NVRAM cache and the shared data structures may or may not be collocated. In one embodiment, the NVRAM cache and the shared data structures are both located in the storage controller memory. Alternatively, for example, the NVRAM cache and/or one or more of the shared data structures may be located in a memory attached to storage devices 28.

In some of the disclosed techniques the servers update the shared data structures upon writing or destaging, using RDMA atomic Compare and Swap (CAS) commands. By using CAS commands, a given server is able to update the shared data structures, and at the same time ensure that the data being written or destaged was not modified by another server. This mechanism enables the servers to maintain system-wide data integrity of shared volumes, without a need for any centralized entity, without a need to obtain locks on data elements, and without a need for servers to communicate with one another for coordination.

Various example storage processes that use the above mechanisms are described herein. Example processes include writing data blocks, reading data blocks, degraded readout in case of failure of a storage device, destaging stripes from the NVRAM cache to the storage devices, rebuilding stripes following failure of a storage device, redistributing stripes as part of addition or removal of a storage device, and garbage collection.

System Description

FIG. 1 is a block diagram that schematically illustrates a computing system 20, in accordance with an embodiment of the present invention. System 20 may comprise, for example, a data center, a High-Performance Computing (HPC) cluster, or any other suitable system. System 20 comprises multiple servers 24 (also referred to as hosts) denoted S1 . . . Sn, and multiple storage devices 28 denoted D1 . . . Dm. The servers and storage devices are interconnected by a communication network 32. The system further comprises one or more storage controllers 36 that manage the storage of data in storage devices 28.

In the disclosed techniques, data-path operations such as writing and readout are performed directly between the servers and the storage devices, without having to trigger or run code on the storage controller CPUs. The storage controller CPUs are involved only in relatively rare control-path operations. Computing systems of this sort are also described, for example, in U.S. patent application Ser. Nos. 14/599,510, 14/697,653, cited above, and in U.S. patent application Ser. No. 14/794,868, which is assigned to the assignee of the present patent application and whose disclosure is incorporated herein by reference.

In the disclosed embodiments, each storage device 28 is a multi-queue storage device, e.g., an NVMe SSD. Each storage device 28 provides multiple server-specific queues for storage commands. In other words, a given storage device 28 queues the storage commands received from each server 24 in a separate respective server-specific queue. The storage devices typically have the freedom to queue, schedule and reorder execution of storage commands.

In the present example, although not necessarily, storage devices 28 are comprised in a storage-device enclosure 30, e.g., a rack, drawer or cabinet. Enclosure 30 further comprises a Non-Volatile Random Access Memory (NVRAM) cache unit 46. Unit 46, referred to herein simply as "NVRAM cache," is used by servers 24 as a front-end for accumulating data in stripes 47, e.g., RAID stripes, before transferring the stripes for storage in storage devices 28. Transfer of stripes from NVRAM cache 46 to storage devices 28 is referred to herein as "destaging." The use of NVRAM cache 46 is addressed in greater detail below. Enclosure 30 may also comprise its own Central Processing Unit (CPU—not shown).

NVRAM cache 46 may be implemented using any suitable NVRAM devices or configurations, for example using a volatile memory such as Dynamic RAM (DRAM) or Static RAM (SRAM) that is backed-up by a temporary power source such as a battery or capacitor. Another non-limiting example on an NVRAM is a DRAM backed-up by a Flash memory.

Storage-related functions in each server 24 are carried out by a respective storage agent 40. Agents 40 typically comprise software modules installed and running on the respective servers. In some embodiments, agent 40 in each server 24 maintains one or more respective queues per storage device 28, corresponding to the respective server-specific queues of the storage devices. (For example, in a server that comprises multiple CPU cores, agent 40 may maintain a respective queue per storage device per CPU core, or per storage device per group of CPU cores.) Agents 40 and storage devices 28 are permitted to reorder storage commands in the queues. The queues in a given agent 40 typically have no visibility outside the context of the respective server. The functions of agents 40, and their interaction with NVRAM cache 46, storage devices 28 and storage controllers 36, are described in detail below.

Servers 24 may comprise any suitable computing platforms that run any suitable applications. In the present context, the term "server" includes both physical servers and virtual servers. For example, a virtual server may be implemented using a Virtual Machine (VM) that is hosted in some physical computer. Thus, in some embodiments multiple virtual servers may run in a single physical computer. Storage controllers 36, too, may be physical or virtual. In an example embodiment, the storage controllers may be implemented as software modules that run on one or more physical servers 24.

Storage devices 28 may comprise any suitable storage medium, such as, for example, Solid State Drives (SSD), Non-Volatile Random Access Memory (NVRAM) devices or Hard Disk Drives (HDDs). Typically, as explained above, storage devices 28 are multi-queue storage devices such as NVMe SSDs. Network 32 may operate in accordance with any suitable communication protocol, such as Ethernet or Infiniband. As explained above, and will be demonstrated in detail below, the disclosed techniques are typically implemented using RDMA, DMA or similar remote direct memory access schemes.

Generally, system 20 may comprise any suitable number of servers, storage devices and storage controllers. In the present example, the system comprises two storage controllers denoted C1 and C2, for resilience. One of the storage controllers is defined as primary, while the other controller serves as hot backup and can replace the primary storage controller in case of failure.

In the embodiments described herein, the assumption is that any server 24 is able to communicate with any storage device 28, but there is no need for the servers to communicate with one another. Storage controllers 36 are assumed to be able to communicate with all servers 24 and storage devices 28, as well as with one another.

The configuration of system 20 shown in FIG. 1 is an example configuration, which is chosen purely for the sake of conceptual clarity. In alternative embodiments, any other suitable system configuration can be used. For example, NVRAM cache unit 46 may be located in any other suitable location in the system, not necessarily coupled to storage devices 28.

The different system elements may be implemented using suitable hardware, using software, or using a combination of hardware and software elements. Each server 24 typically comprises a suitable network interface for communicating over network 32, e.g., with the NVRAM cache, storage devices and/or storage controllers, and a suitable processor that carries out the various server functions. Each storage controller 36 typically comprises a suitable network interface for communicating over network 32, e.g., with the storage devices and/or servers, and a suitable processor that carries out the various storage controller functions.

In some embodiments, servers 24 and/or storage controllers 36 comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Figure 2:
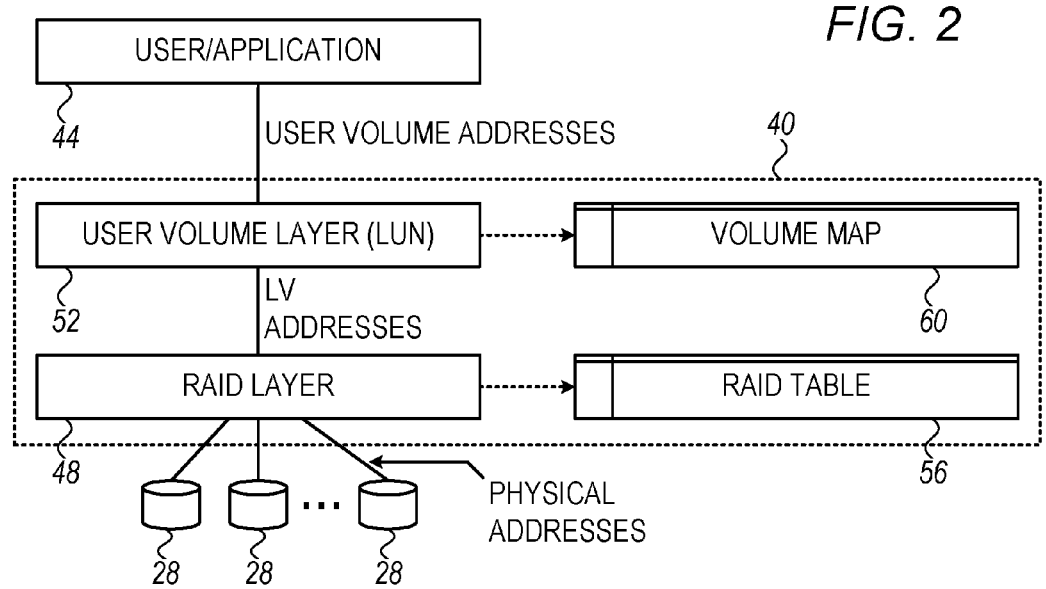
FIG. 2 is a block diagram that schematically illustrates elements of a storage agent, in accordance with an embodiment of the present invention.

FIG. 2 is a block diagram that schematically illustrates elements of storage agent 40, in accordance with an embodiment of the present invention. A respective storage agent of this sort typically runs on each server 24 and performs storage-related functions for user applications 44 running on the server. As noted above, servers 24 may comprise physical and/or virtual servers. Thus, a certain physical computer may run multiple virtual servers 24, each having its own respective storage agent 40.

In the disclosed embodiments, each storage agent 40 comprises a Redundant Array of Independent Disks (RAID) layer 48 and a user-volume layer 52. RAID layer 48 carries out a redundant storage scheme over storage devices 28, including handling storage resiliency, detection of storage device failures, rebuilding of failed storage devices and rebalancing of data in case of maintenance or other evacuation of a storage device. RAID layer 48 also typically stripes data across multiple storage devices 28 for improving storage performance.

In one simple example embodiment, RAID layer 48 implements a RAID-10 scheme, i.e., replicates and stores two copies of each data item on two different storage devices 28. One of the two copies is defined as primary and the other as secondary. The primary copy is used for readout as long as it is available. If the primary copy is unavailable, for example due to storage-device failure, the RAID layer reverts to read the secondary copy. Other examples described below use RAID-6, in which data is stored in stripes that each comprises multiple data blocks and two parity blocks.

Alternatively, RAID layer 48 may implement any other suitable redundant storage scheme (RAID-based or otherwise), such as schemes based on erasure codes. The description that follows uses the terms "redundancy" and "parity" interchangeably. The redundancy or parity may be calculated over the data in any suitable way, such as using XOR or a suitable error correction code. In some embodiments, a T10-PI scheme or other data-integrity protection scheme may be implemented on top of the redundant storage scheme.

RAID layer 48 accesses storage devices 28 using physical addressing. In other words, RAID layer 48 exchanges with storage devices 28 read and write commands, as well as responses and retrieved data, which directly specify physical addresses (physical storage locations) on the storage devices. In this embodiment, all logical-to-physical address translations are performed in agents 40 in the servers, and none in the storage devices.

The RAID layer maps between physical addresses and Logical Volumes (LVs) to be used by user-volume layer 52. In a RAID-10 configuration, for example, each LV is mapped to two or more physical-address ranges on two or more different storage devices. The two or more ranges are used for storing the replicated copies of the LV data as part of the redundant storage scheme.

The redundant storage scheme (e.g., RAID) is thus hidden from user-volume layer 52. Layer 52 views the storage medium as a set of guaranteed-storage LVs. User-volume layer 52 is typically unaware of storage device failure, recovery, maintenance and rebuilding, which are handled transparently by RAID layer 48. (Nevertheless, some optimizations may benefit from such awareness by layer 52. For example, there is no need to rebuild unallocated storage space.)

User-volume layer 52 provides storage resources to applications 44 by exposing user volumes that are identified by respective Logical Unit Numbers (LUNs). The terms "user volume" and "LUN" are used interchangeably herein. In other words, a user application 44 views the storage system as a collection of user volumes, and issues storage commands having user-volume addresses.

Storage agent 40 translates between the different address spaces using a RAID table 56 and a volume map 60. RAID table 56 holds the translation between LV addresses and physical addresses, and volume map 60 holds the translation between user-volume addresses and LV addresses.

In the embodiments described herein, the user-volume addresses are also referred to as User Block Addresses (UBAs) and the LV addresses are also referred to as RAID Block Addresses (RBAs). Thus, RAID layer 48 in each server 24 translates between UBAs and RBAs.

In the description that follows, the basic storage unit in the RBA space is a RAID page, e.g., a 512B, 4 KB or 32 KB page, for example. The terms "page" and "block" are used interchangeably herein. In alternative embodiments, any suitable page size can be used. Each RAID page has a respective RAID Page Descriptor (RPD). The RPD of a RAID page specifies whether the RAID page is currently cached in NVRAM cache 46 or stored in storage devices 28, and the exact location of the RAID page in the cache or on the storage devices.

In some embodiments, the overall RBA space is divided into two or more chunks of size CS, and the disclosed technique may be applied separately per chunk. This implementation reduces the address space within each chunk, and therefore reduces the number of bits required to address memory blocks. The total memory size required for storing metadata is thus reduced. In some embodiments such chunks may be assigned adaptively to servers 24, e.g., for distributing background tasks such as garbage collection.

Typically, any server 24 may attach to any user volume. A given user volume may have multiple servers attached thereto. In some embodiments, storage controllers 36 define and maintain a global volume map that specifies all user volumes in system 20. Volume map in each storage agent 40 comprises a locally-cached copy of at least part of the global volume map. In agent 40 of a given server, volume map 60 holds at least the mapping of the user volumes (LUNs) to which this server is attached. In an embodiment, volume map 60 supports thin provisioning.

Certain aspects of distributed storage systems of the sort shown in FIGS. 1 and 2 are also addressed in U.S. patent application Ser. Nos. 14/599,510, 14/697,653 and 14/794,868, cited above.

NVRAM Cache Considerations

In some embodiments, each server 24 is assigned a respective area in NVRAM cache 46 for storing a respective set of RAID stripes 47. Servers 24 typically write to and read from NVRAM cache 46 using RDMA. The areas assigned to servers S1, S2, . . . , Sn are shown in FIG. 1 as "S1 stripes", "S2 stripes", . . . , "Sn stripes", respectively. Each RAID stripe has a respective RAID Stripe Descriptor (RSD).

Typically, storage controllers 36 assign each agent a pool of free NVRAM cache pages. Agent 40 obtains additional free NVRAM cache pages from the storage controllers as needed. Agent 40 of each server 24 uses its assigned area as a write combining cache, i.e., gradually accumulates data pages that are en-route to storage.

The NVRAM cache area of a given server is typically distributed over multiple failure domains. Agent 40 typically acknowledges completion of a write command only after at least two copies of the data page in question have been cached in NVRAM cache pages on at least two failure domains. Depending on system requirements, a larger number of copies may be stored.

Typically, each agent 40 manages its respective area in NVRAM cache 46. Among other management tasks, agents 40 perform a "cleanup" process, e.g., upon server failure or unmapping. This process is described below.

The size of a stripe is N+C pages, wherein N denotes the number of data pages per stripe, and C denotes the number of redundancy pages per stripe. The size of the cache area assigned to a given server is typically a multiple of the stripe size, at least a single stripe and typically several stripes. A large cache area per server allows agent 40 to accumulate several stripes before destaging them to storage devices 28, thereby improving performance. In Flash-based storage devices, for example, accumulating several stripes may allow destaging at a granularity of the erasure-block or clustered-block of the storage device, so as to considerably improve the endurance and performance of the storage device. In some embodiments, a larger NVRAM cache with some replacement policy (e.g., Least Recently Used—LRU) may also be implemented.

As will be described below, in some embodiments NVRAM cache 46 is also used as a read cache, e.g., for reducing read latency and increasing storage throughput. Each server typically manages its read cache separately and autonomously using RDMA, using some replacement policy such as LRU. Each server may perform garbage collection to its read cache, to remove memory pages that are no longer referenced.

In some embodiments, when the CPU of a server comprises multiple CPU cores, an NVRAM cache area may be assigned separately to each CPU core, for reducing contention on the server side.

In some embodiments, NVRAM cache 46 may be distributed among storage devices 28, e.g., by equally splitting the cache among the storage device and allocating an equal portion on each storage device, while preserving the replication on different failure domains. In other embodiments, NVRAM cache 46 may reside, in a mirrored configuration, on storage controllers 36. As yet another example, NVRAM cache 46 may be distributed among servers 24, again preserving replication on different failure domains.

Typically, each memory page in NVRAM cache 46 (referred to as a "NVRAM cache page" or "cache page") has a respective Cache Page Descriptor (CPD). The CPDs are also replicated with the cache pages. Each CPD specifies a back-reference to the RPD that most recently mapped it.

Data Structures for Supporting Distributed Raid with NVRAM Cache Using RDMA

Figure 3:
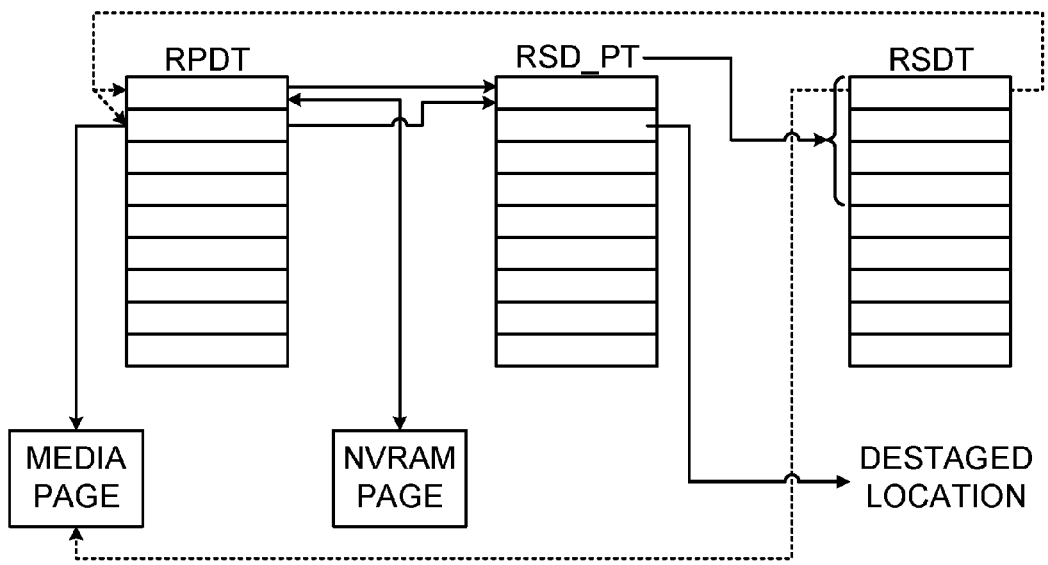
FIG. 3 is a diagram that schematically illustrates data structures used in the computing system of FIG. 1, in accordance with an embodiment of the present invention.

FIG. 3 is a diagram that schematically illustrates data structures used in computing system 20, in accordance with an embodiment of the present invention. In the present example, the data structures shown in FIG. 3 reside in the memories of storage controllers 36. The data structures are replicated in the two storage controllers C1 and C2 for resilience. The data structures are accessible to agents 40 using RDMA. Thus, agents 40 are able to read and/or modify the data structures of FIG. 3 without running code on the CPUs of the storage controllers. In other embodiments, the data structures may be sharded and replicated on multiple servers, e.g., on servers 24. A given agent 40 on a given server 24 may cache relevant parts of the data structures locally for fast access.

The configuration of FIG. 3 shows three major data structures—a RAID Page Descriptor Table (RPDT), a RAID Stripe Descriptor Table (RSDT), and a RAID Stripe Descriptor Page Table (RSD_PT). The description that follows assumes that the entire RBA space is managed using a single set of such data structures. When the RBA space is divided into chunks, as described above, a separate configuration of data structures is used per chunk.

In an embodiment, the RPDT is implemented as a flat table, which lists the RPDs of all the RAID pages that are currently stored in system 20. Each RPD (i.e., each entry of the RPDT) comprises the following data fields:

"Present bit"—A bit that specifies whether the RAID page is cached in NVRAM cache 46 or stored on storage devices 28. In the present example, a present bit value of "1" (set) indicates that the RAID page is present in NVRAM cache 46. A present bit value of "0" (not set) indicates that the RAID page is stored on storage devices 28.

When the present bit is set—Location of the RAID page in the NVRAM cache. The location is specified using a server ID (e.g., 16 bits), a cached block ID (e.g., 10 bits), and possibly some reserved bits (e.g., 0-5 or 0-37 bits).

When the present bit is not set—Location of the RAID page on the storage devices. The location is specified using a storage-device ID (e.g., 5 bits) indicating the storage device on which the RAID page is stored, a Logical Block Address (LBA, e.g., 18 or 28 bits) indicating the LBA used for storing the RAID page on that storage device, a RAID stripe ID (e.g., 18 or 28 bits), and possibly some reserved bits (e.g., 2 bits).

In an embodiment, the LBA field in the RPD is optional, since this information is also available in the RSD, to be described below. Omitting the LBA from the RPD, however, typically incurs two round-trip accesses for obtaining the LBA. Moreover, the RSD may be paged-out to a storage device, which would slow down the process even further. Since only reads are affected by this degradation, this implementation may be feasible in some embodiments.

The sizes of the data fields in the example above correspond to a system having twenty-four storage devices 28, by way of example. The sizes of the LBA and stripe-ID fields typically depend on the size of the RBA space or of the chunk in question. Thus, to reduce in-memory metadata size, multiple relatively small RAID chunks may be beneficial. For example, the system could use 13 bits for addressing in 32 MB chunks, thus fitting an RPD into a 32-bit value, or 1-2 TB, fitting the RPD into a 64-bit value.

In an embodiment, the RSDT is implemented as a flat table, which lists the RAID Stripe Descriptors (RSDs) of all the RAID stripes that are currently managed by system 20. Each RSD (i.e., each entry of the RSDT) comprises multiple RSD Entries (RSDEs), each specifying a respective block (data or parity block) in the stripe.

In the present example, the RSDE of each block has 32-64 bits and comprises the following data fields:
  RPDT index (e.g., 13 or 28 bits), indicating the RPDT entry that stores the RPD of the RAID page stored in the block.
  Storage device ID (e.g., 5 bits), indicating the storage device on which the block is stored.
  LBA (e.g., 13 or 28 bits), indicating the LBA used for storing the block on the storage device.

The RSD in the present example has the following data fields:
  N RSDEs, for the N respective data blocks in the stripe.
  C RPDs, for the C respective parity blocks in the stripe.
  RAID stripe width (holds the value of N, in log(N,2) bits).

The RSD_PT is an optional data structure, which enables paging-out the RSDT or parts thereof to storage devices 28, instead of holding the entire RSDT in the memory of storage controllers 36. When used, each entry of the RSD_PT addresses a section of the RSDT. The section size is typically a system parameter. In an embodiment, the RSD_PT is implemented as an array of bits, with each bit specifying whether the corresponding section of the RSDT is present in NVRAM or paged-out to storage devices 28. In such an implementation, the paged-out location of the RSD can be inferred from the bit location (e.g., offset).

Agents 40 may access the RSD_PT using RDMA, so as to identify whether a section of the RSDT has been paged-out, and if so, to obtain the storage location of this section on storage devices 28. Using this information, agents 40 may then access the paged-out section on the storage devices.

In a typical embodiment, the RPDT and RSD_PT are stored in-memory, e.g., in an NVRAM of the storage controllers. The RSDT is typically split—Some RSDs are stored in-memory at the storage controllers, and other RSDs are paged-out to storage devices 28.

In some embodiments, system 20 maintains a "server-specific potentially-dirty list" per server 24. The server-specific potentially-dirty list of a server lists the RPD IDs of the RAID pages written by this server. The server-specific potentially-dirty lists are typically stored in a mirrored configuration on both storage controllers 36. These lists are used, for example, for recovering from a "write hole" scenario in which a server crashes during an operation. In alternative embodiments, the system may use transaction logs instead of potentially-dirty lists.

The data structure arrangement described above and depicted in FIG. 3 is chosen purely for the sake of conceptual clarity. In alternative embodiments, the disclosed techniques can be implemented using any other suitable arrangement of data structures.

Example I/O Operations

The description that follows describes several processes that are carried out by servers 24 using the disclosed distributed RAID and NVRAM cache schemes. The processes below include, for example, writing data to a stripe, reading data from a stripe, destaging stripes from NVRAM cache to persistent storage, rebuilding a stripe following failure of a storage device, redistributing data as part of addition or removal of a storage device, and garbage collection.

As will be shown below, these processes are carried out by the servers alone, without having to execute code on the storage controllers. Moreover, even though the user volumes may be shared among multiple servers, the processes described below do not involve any communication between the servers, and do not require the servers to obtain locks on the data items being written.

In some embodiments, the disclosed processes use the RDMA atomic Compare and Swap (CAS) primitive to write data while protecting from collisions between multiple servers that attempt to write to the same block or stripe. The CAS command typically specifies an address, new data to be written to that address, and a test value. The storage device tests whether the data currently stored in the address is equal to the test value, and writes the new data only if the test is successful. The test and subsequent write are performed by the storage device atomically, i.e., without allowing any intervening writes to the address in question.

In some embodiments, agent 40 uses the RAID atomic CAS command only when needed, e.g., only when the user volume is actually shared with at least one other server. If the volume is not shared, agent 40 may carry out the disclosed processes while replacing the RAID atomic CAS commands with normal write commands. This optimization is desirable, since the CAS command is considerably more expensive in terms of computations and latency than the normal write command. A given agent 40 may use various ways to determine whether a user volume is shared with another server or not. For example, in an embodiment, user volume layer 52 may hint RAID layer 48 whether the user volume is mapped by any server other than the current server. Care should be taken, however, to ensure that no other process, e.g., a background process such as garbage collection, writes to the volume in question.

Write Operation

Figure 4:
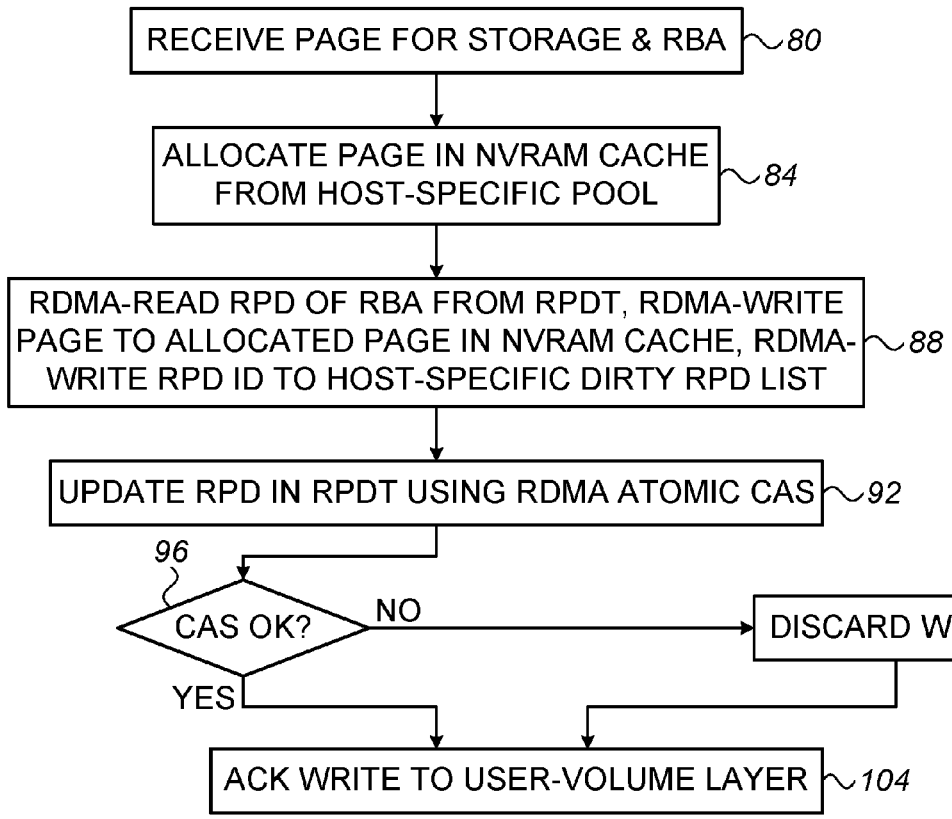
FIG. 4 is a flow chart that schematically illustrates a method for performing a write command, in accordance with an embodiment of the present invention.

FIG. 4 is a flow chart that schematically illustrates a method for performing a write command, in accordance with an embodiment of the present invention. Such a method is typically carried out by agent 40 in each server 24. The description below refers to a single data page, for the sake of clarity. When storing multiple data pages, the process of FIG. 4 is typically repeated per data page, possibly at least partially in parallel.

The method begins with RAID layer 48 in agent 40 of a given server 24 receiving a data page for storage at a certain RBA, at a page input step 80. At an allocation step 84, agent 40 allocates an NVRAM cache page in NVRAM cache 46 from the pool of free NVRAM cache pages.

At a writing step 88, agent 40 writes the data page by performing three operations, typically in parallel: Agent 40 reads (using RDMA) the RPD of the RBA of the data page from the RPDT; writes the data page (using RDMA) to the allocated NVRAM cache page (typically to two redundant NVRAM cache pages on different failure domains); and writes the RPD ID (using RDMA) to the server-specific potentially-dirty list.

At an RPD updating step 92, agent 40 updates the RPD of the data page in the RPDT using RDMA atomic CAS. The RPD is typically updated in both storage controllers, with a certain fixed ordering. The test value in the CAS command is the RPD that was read from the RPDT at step 88 above.

At a CAS checking step 96, agent 40 checks whether the atomic CAS command of step 92 was successful or not. A failure of the CAS command means that the RPD of the data page has changed between step 88 and step 92. In such a case, agent 40 concludes that some other server 24 has modified the data page and updated the RPD. Therefore, to avoid inconsistency, agent 40 discards the write operation, at a discarding step 100, and acknowledges the write command, at an acknowledgement step 104. Otherwise, i.e., if the CAS command completed successfully, agent 40 proceeds to acknowledge the write command at acknowledgement step 104, without discarding.

In the example above, agent 40 used the atomic CAS command to ensure that the data page in question is not modified by some other intervening write command by another server. Such a scenario is possible only if the user volume in question is shared between two or more servers. As noted above, if agent 40 can guarantee that the user volume is not shared, step 92 can be carried out using a normal write command instead of CAS, and steps 96 and 100 can be omitted.

Destage Operation

In some embodiments, a predefined number of stripes (possibly a single stripe but typically several stripes) is defined in system 20 as a "destage unit." Each agent 40 accumulates data pages in NVRAM cache 46, e.g., using the method of FIG. 4 above, until an entire destage unit has been accumulated. Only at this point, agent 40 calculates the parity for the stripes of the destage unit, allocates storage space for the stripes on the storage devices 28, and transfers the full stripes to the storage devices.

Figure 5:
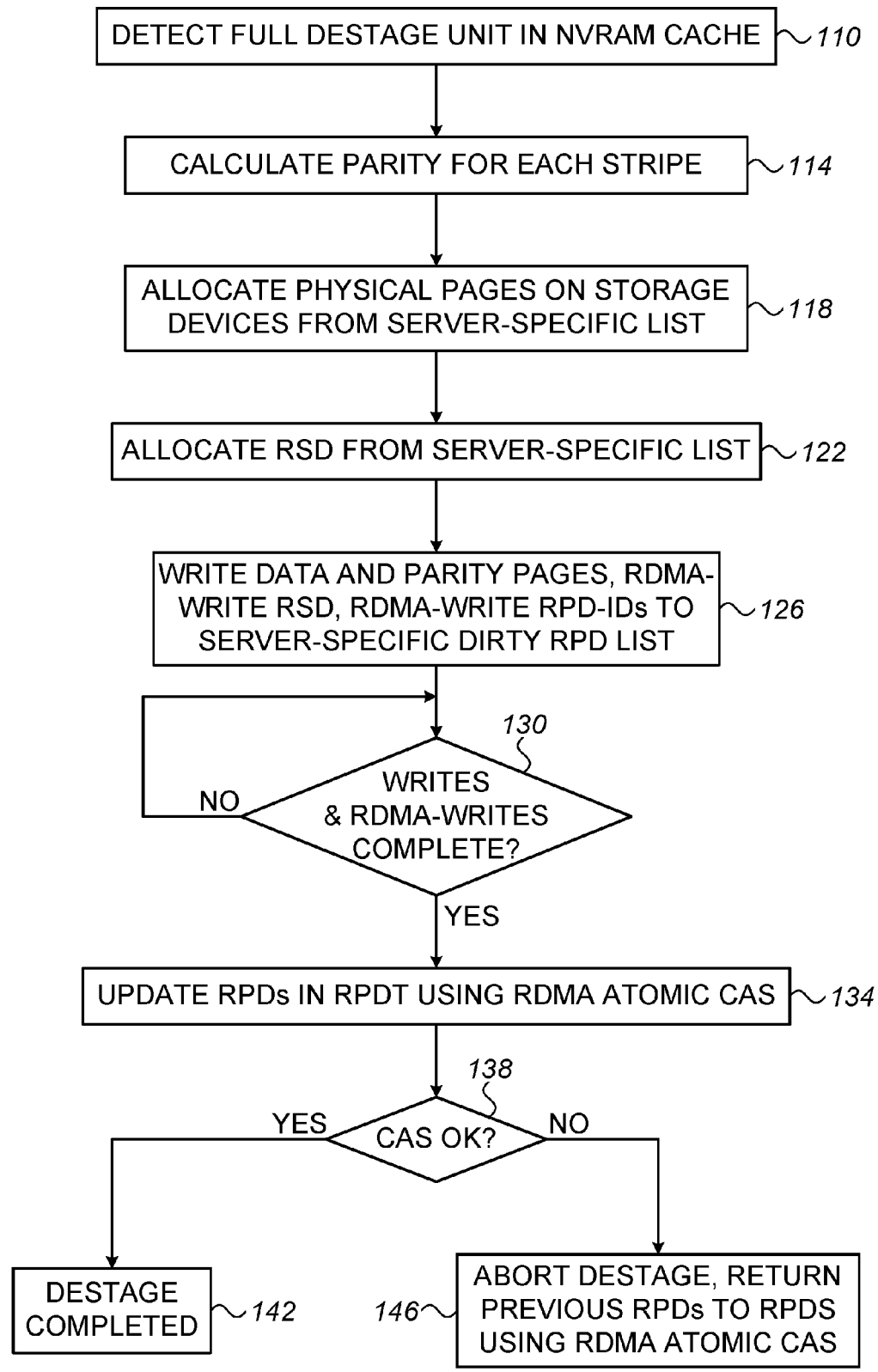
FIG. 5 is a flow chart that schematically illustrates a method for destaging RAID stripes from NVRAM cache to persistent storage, in accordance with an embodiment of the present invention.

FIG. 5 is a flow chart that schematically illustrates a method for destaging RAID stripes from NVRAM cache 46 to storage devices 28, in accordance with an embodiment of the present invention. Such a method is typically carried out by agent 40 is each server 24.

The method begins with agent 40 detecting that an entire destage unit has been accumulated by the server in NVRAM cache 46, at a destage triggering step 110. In some embodiments, before triggering a destage operation, agent removes from NVRAM cache 46 pages that hold stale data, i.e., pages that are not pointed to by the RPD because they were overwritten. The RPD can be found from the Cache Page Descriptor (CPD). After removing the stale NVRAM cache pages, agent 40 checks again whether a destage unit is full, and if so, proceeds with the destage operation.

Agent 40 calculates the parity pages for the various stripes in the destage unit, at a parity calculation step 114. At a storage page allocation step 118, agent 40 allocates physical pages on storage devices 28 for the data pages and parity pages of the destage unit. Agent 40 typically holds a pool of free physical pages for this purpose, and obtains additional free physical pages from the storage controllers as needed.

At an RSD allocation step 122, agent 40 allocates RAID Stripe Descriptors (RSDs) for the stripes of the destage unit. Agent 40 typically holds a pool of RSD allocations for this purpose, and obtains additional RSD allocations from the storage controllers as needed.

Then, at a destaging step 126, agent 40 transfers the full stripes (including data and parity pages) from NVRAM cache 46 to storage devices 28. Agent 40 performs three operations, typically in parallel: Agent 40 writes the data pages and parity pages to the allocated physical pages on storage devices 28; writes the appropriate data fields in the allocated RSDs (using RDMA write); and writes the RPD IDs to the potentially-dirty list of the server (using RDMA write). At a destage checking step 130, agent 40 waits until all the write and RDMA-write operations of step 126 are completed.

Then, at an RPD updating step 134, agent 40 updates the RPDs of all the data and parity pages in the RPDT using RDMA atomic CAS. The RPDs are typically updated on both storage controllers 36, in consistent order. As explained above, the RPD of each (data or parity) page points to the RSD of the stripe to which the page belongs.

At a CAS verification step 138, agent 40 checks whether the CAS atomic writes of step 134 were all successful. If successful, agent 40 considers the destage operation completed, at a destage completion step 142.

Otherwise, if one or more of the CAS atomic writes of step 134 have failed, agent 40 concludes that the RPDs of one or more pages in the destage unit have changed between step 134 and step 138, because another server 24 has modified the data and updated the RPDs. Agent 40 therefore aborts the destage operation, at a destage aborting step 146. In order to return to the state prior to destaging, agent 40 returns the values of the PRDs to their previous values using CAS atomic write. The method may then loop back to step 110, in which agent 40 cleans-up stale NVRAM cache pages and waits for a destage unit to fill up.

As explained above with regard to the write operation, in some embodiments agent 40 updates the RPDs using normal RDMA write instead of RDMA atomic CAS, if it is guaranteed that the user volume is not shared with any other server. In this case, step 138 is omitted.

In some embodiments, agent 40 retains on server 24 local copies of the data pages of the destage unit, in order to calculate the parity pages at step 114. In an alternative embodiment, agent 40 may avoid the need to retain such local copies, by calculating the parity progressively, as the stripes gradually fill up.

In this embodiment, agent 40 retains C interim parity pages for the stripe that is currently being accumulated. When adding a new data page to the stripe, agent 40 updates the interim parity pages to account for the new data page. When the stripe becomes full, the interim parity pages becomes valid parity pages.

If an RPD becomes invalid during accumulation of the interim parity (e.g., because another server writes to the same stripe), agent 40 needs to revert to RDMA read the data pages in order to calculate the parity correctly. Old data pages should be read in case there are less invalid RPDs than valid RPDs, and new pages should be read otherwise.

Partial Destage Operation

When carrying out the destage operation of FIG. 5 above, an underlying assumption is that the garbage collection process is sufficiently fast. If the garbage collection process is slow, agent 40 will have difficulty in filling-up an entire destage unit. The destage process may be delayed, and in turn slow the entire storage process to the rate of garbage collection. Moreover, in some embodiments, e.g., when using Flash-based storage devices, the garbage collection process may be detrimental to performance and storage-device endurance, due to its inherent write amplification.

One possible solution to these problems is for agent to revert to a "partial destaging" process. In this process, instead of destaging full stripes, agent 40 is allowed to destage partially-filled stripes to the storage devices, by looking-up and filling stripes with pre-existing holes (stale NVRAM cache pages), such that new data is placed instead of the holes, albeit updating the stripe parities. Agent 40 would typically prefer to add new data pages to emptier stripes, in order to reduce write and read amplification.

Figure 6:
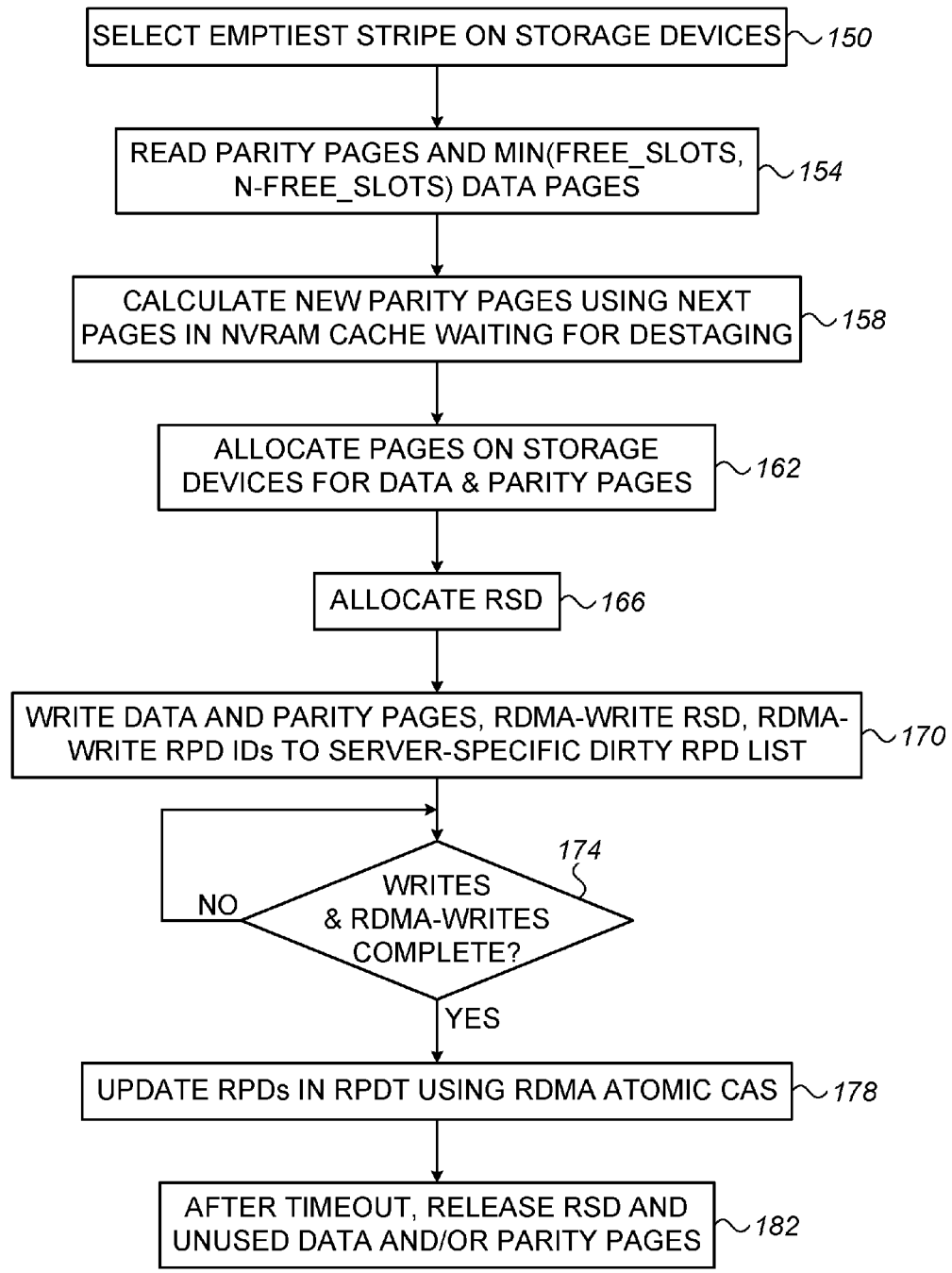
FIG. 6 is a flow chart that schematically illustrates a method for partial destaging of a RAID stripe, in accordance with an embodiment of the present invention.

FIG. 6 is a flow chart that schematically illustrates a method for partial destaging of a RAID stripe, in accordance with an embodiment of the present invention. Such a method is typically carried out by agent 40 is each server 24.

The method begins with agent 40 selecting the emptiest known stripe on storage devices 28, at a stripe selection step 150. In an example embodiment, agent 40 records the indices of the emptiest RSDs it has encountered in previous write operations. In another embodiment, agent 40 may crawl the RSDT to find the emptiest stripe, or identify the emptiest stripe in any other suitable way. The number of free pages in this stripe is referred to as "free_slots".

At a stripe readout step 154, agent 40 reads from the selected stripe (i) the parity pages, and (ii) min(free_slots, N-free_slots) data pages. At a new parity calculation step 158, agent 40 calculates new parity pages for the stripe, based on the existing parity pages and the next free_slots data pages that are pending for destaging in NVRAM cache 46.

At a physical page allocation step 162, agent 40 allocates physical pages on storage devices 28 for the data pages and parity pages of the stripe. As explained above, the physical pages are typically allocated from a pool of free physical pages held by agent 40. At a new RSD allocation step 166, agent 40 allocates a new RSD for the stripe from the pool of RSD allocations.

At a partial destaging step 170, agent 40 writes the data and parity pages of the stripe to storage devices 28. Agent 40 performs three operations, typically in parallel: Agent 40 writes the data pages and parity pages to the allocated physical pages on storage devices 28; writes the appropriate data fields in the allocated RSD (using RDMA write); and writes the RPD IDs to the potentially-dirty list of the server (using RDMA write).

At steps 162-170, the data and parity pages are not updated in-place, but rather to new physical pages and to a newly allocated RSD. Such new allocations are needed to avoid collision with a degraded read (described below) that accesses the same stripe.

At a partial destage checking step 174, agent 40 waits until all the write and RDMA-write operations of step 170 are completed. At an RPD updating step 178, agent 40 updates the RPDs of the data and parity pages in the RPDT using RDMA atomic CAS. The RPDs are typically updated on both storage controllers 36, in consistent order. The RPD of each (data or parity) page points to the new RSD of the stripe.

As in the full-destage process of FIG. 5, agent 40 now verifies that all RDMA atomic CAS operations were successful to avoid collision with another server. If collision is detected, an aborting procedure similar to step 146 of FIG. 5 is performed.

At a releasing step 182, after a certain timeout, agent 40 returns the previous RSD and data and parity pages to the server-specific pools. The timeout is typically needed to ensure that no other server needs the RSD and pages for performing a degraded read.

In various embodiments, agent 40 may use various criteria to decide when to wait for additional pages and when to trigger partial destaging. In one embodiment, agent 40 begins partial destaging as soon as the number of pending data pages is sufficient for filling the emptiest known stripe. In alternative embodiments, agent continues to wait beyond this point, attempting to detect an even emptier stripe.

Read Operation

Figure 7:
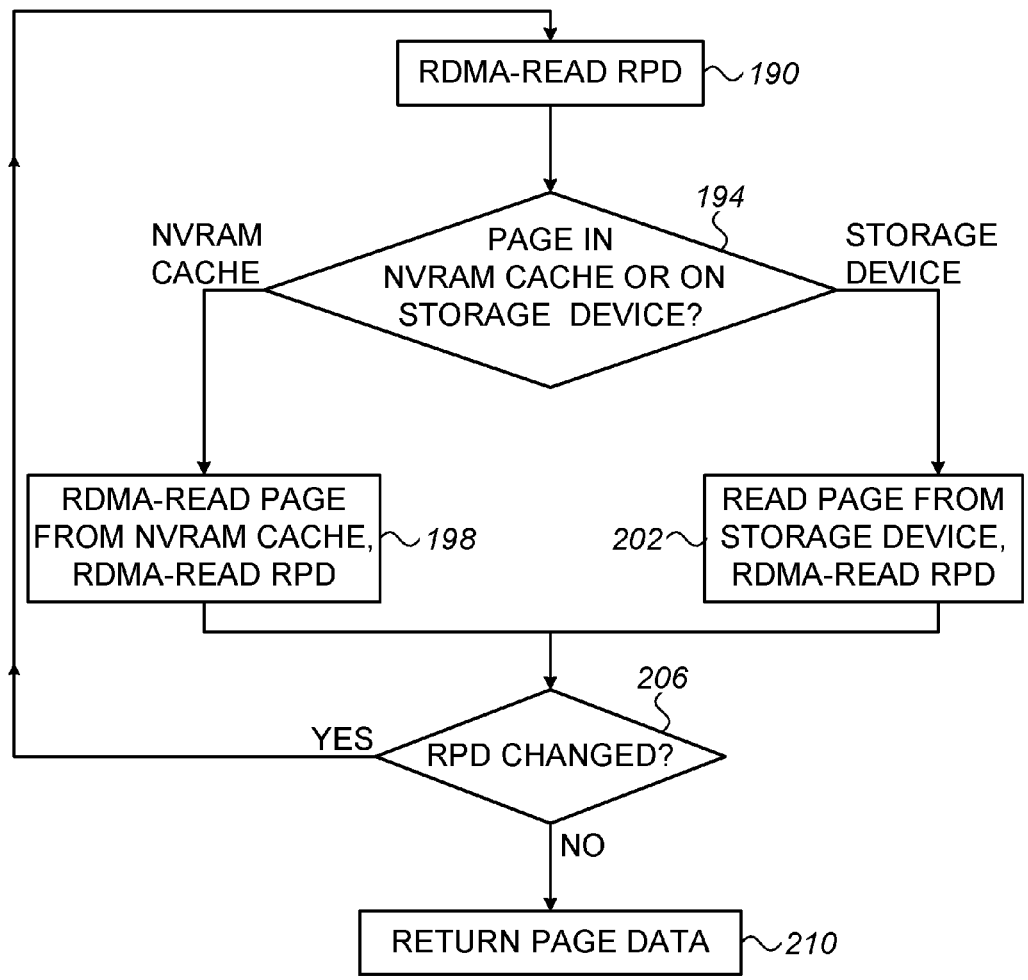
FIG. 7 is a flow chart that schematically illustrates a method for performing a read command, in accordance with an embodiment of the present invention.

FIG. 7 is a flow chart that schematically illustrates a method for performing a read command, in accordance with an embodiment of the present invention. Such a method is typically carried out by agent 40 in each server 24. The description below refers to a single data page, for the sake of clarity. When reading multiple data pages, the process of FIG. 7 is typically repeated per data page, possibly at least partially in parallel.

The method begins with agent 40 reading the RPD of the data page (using RDMA read), at an RPD readout step 190. At a location checking step 194, agent checks the "Present bit" in the RPD, to determine whether the data page is cached in NVRAM cache 46 or stored on storage devices 28.

If the data page is cached in NVRAM cache 46, agent 40 reads the data page from the NVRAM cache (using RDMA read), at a cache readout step 198. Following readout of the data page, agent 40 reads the RPD again (using RDMA read). If the data page is stored on storage devices 28, agent 40 reads the data page from the storage devices, at a storage readout step 202. Following readout of the data page, agent 40 reads the RPD again (using RDMA read).

At an RPD checking step 206, agent 40 checks whether the RPD read at step 198 or 202 differs from the RPD read at step 190. If the RPD has changed, agent 40 concludes that a collision has occurred and the method loop back to step 190 for retrying the readout operation. Otherwise, agent 40 provides the data page as output, at an output step 210, and the method terminates.

As explained above, in some embodiments agent 40 uses the NVRAM cache as a read cache, as well. In these embodiments, agent 40 adds the following operations to step 202.

Allocate a read-cache page in NVRAM cache 46.
Read the data page from storage devices 28 and save a copy in the allocated read-cache page in NVRAM cache 46.
Update the RPD of the data page using RDMA atomic CAS. In the updated RPD, the "Present bit" is set (indicating that the page is present in the NVRAM cache), and the RPD points to the read-cache page in NVRAM cache 46 in which the copy of the data page is saved.

Degraded Read Operation

The term "degraded read" refers to a process of reconstructing a data page from the other data and parity pages in the stripe. This process is carried out, for example, when agent 40 attempts to read a data page from a storage device, but finds that the storage device is unavailable. Degraded read is relevant to stripes that have been destaged to storage devices 28.

Consider a scenario in which, at step 202 of FIG. 7, agent 40 fails to read the data page from the storage device. In response to the failure, in an embodiment, agent 40 carries out the following operations:

- Read the RSD of the stripe to which the data page belongs. The RSD is typically read by:
  i. Reading the relevant RSD_PT bit using RDMA read, according to the stripe ID found in the RPD obtained at step 190.
  ii. If, according to the RSD_PT bit, the RSD is present in the NVRAM cache, read the RSD from the NVRAM cache using RDMA read. Otherwise, read the RSD from storage devices 28.
- Read all the data and parity pages from the stripe that are needed for recovering the requested data page.
- Read the RPD of the requested data page again, using RDMA read. If the RPD has changed since step 190, restart the entire read process, from step 190.
- Otherwise, calculate the requested data page from the other data and parity pages in the stripe, and provide the reconstructed data page as output.
- Optionally, allocate a write-cache page in NVRAM cache 46, write the reconstructed data page to this write-cache page using RDMA write, and update the RPD of the data page using RDMA atomic CAS.

Stripe Re-Distribution Operation

In some embodiments, a storage controller 36 or a given agent 40 carries out a stripe re-distribution process, which re-distributes the pages of a RAID stripe over a larger or smaller number of storage devices 28. The description that follows refers to "a processor" that performs re-distribution. This processor may comprise, for example, the CPU of a storage controller 36 or of a server 24. When performed by a storage controller, the process is typically mirrored to the peer storage controller.

Re-distribution is typically performed upon addition or removal of a storage device 28. In contrast to rebuild processes, to be described below, stripe re-distribution is performed with advance information that a storage device is to be added or removed.

In an example embodiment, when a new storage device 28 is added to system 20, the processor may save storage space by rebuilding existing stripes, so as to form wider stripes (using a modified RAID scheme that uses a larger number of pages per stripe). As noted above, the RSD of each stripe comprises a stripe width field, thus supporting the possibility to define a different stripe width per stripe.

In the redistribution process, the processor typically reads existing stripes into NVRAM cache 46 while atomically updating the RPDs of their pages, and then adding these pages to existing stripes. In an embodiment, as long as there are non-redistributed stripes in the RSDT, the processor performs the following:

- Select a stripe for re-distribution from the RSDT. This stripe is referred to as a source stripe.
- Move the selected stripe to NVRAM cache 46 (e.g., using read operations such as described in FIG. 7).
- For each page in the source stripe, select a respective stripe from the RSDT. These stripes are referred to as destination stripes.
- For each destination stripe, move the destination stripe to NVRAM cache 46, add the corresponding page from the source stripe to the destination stripe, and destage the (now wider) destination stripe to storage devices 28. As part of the destaging process, update the RSD of each destination stripe to reflect the new (larger) stripe width. There is no need to overwrite the pages in the destination stripe that did not change. Then, after a time-out, perform garbage collection on the released parity pages and RSD.

In an embodiment, if the processor cannot find a sufficient number of destination stripes, the processor may either retain the last source stripe in NVRAM, or refrain from re-distributing the last source stripe. The above process is depicted purely by way of example, and any other suitable re-distribution process may be used. For example, the processor may re-distribute stripes over multiple new storage devices at the same time, incurring only a single re-distribution operation with only a single parity calculation and rewrite per stripe.

In an embodiment, when a storage device 28 is about to be removed from system 20, the processor may re-distribute the stripes in which that storage device takes part over the remaining number of storage devices. In this embodiment, the processor reduces the tripe width from N to N−1 by performing the following:

- Select N−1 source stripes from the RSDT.
- For each source stripe:
  - Identify in the source stripe the page that is stored on the storage device to be removed. Copy the identified page to NVRAM cache 46, including updating the RPD of the page using CAS to point to the NVRAM cache.
  - Read the existing parities of the source stripe, and calculate new parities (excluding the page that is stored on the storage device to be removed).
  - Allocate two new pages on the storage devices of the new parities, and destage the parities to the new locations.
  - Allocate and write new RSD, indicating the new RAID scheme with the smaller stripe width.
  - RDMA write the RPD ID to the server-specific potentially-dirty RPD list.
  - Update all RPDs using CAS. In case of CAS failure (indicative of collision), abort the transaction (including reverting to previous RPDs using CAS) and retry.
- Destage a new stripe comprising the N−1 pages, which belonged to the N−1 respective source stripes and reside on the storage device to be removed.
- After a time-out, perform garbage collection on the released parity locations and RSDs.

In an embodiment, if the processor cannot find N−1 source stripes to re-distribute, the processor may perform the above process for a smaller number of source stripes, and either retain the resulting pages in the NVRAM cache or destage them in a partial stripe. The above process is depicted purely by way of example, and any other suitable re-distribution process may be used. For example, the processor may perform a single re-distribution process that reduces the stripe width from N to M, for any desired N>M>0.

Stripe Rebuilding Operation

In some embodiments, a storage controller 36 or a given agent 40 carries out a stripe rebuilding process, which reconstructs RAID stripes following uncoordinated unavailability (e.g., failure or uncoordinated removal) of a storage device 28. The description that follows refers to "a processor" that performs rebuilding. This processor may comprise, for example, the CPU of a storage controller 36 or of a server

24. When performed by a storage controller, the process is typically mirrored to the peer storage controller.

In some embodiments, the processor recalculates the pages that resided on the unavailable storage device from the remaining data and parity pages of the respective stripes. The recalculation may be performed using the "degraded read" process described above. The recalculated pages may then be destaged to one or more functional storage devices.

In some cases, however, it is desirable to reconstruct and store the data that resided on the unavailable storage device as quickly as possible, before compacting the existing stripes into a new (narrower) RAID scheme. This sort of rebuilding shortens the time duration in which the system (and possibly some applications) operate with degraded performance, at the expense of prolonging the duration of time in which the system operates with reduced redundancy.

In such embodiments, the processor performs the following two phases:

Phase 1:
Select N−1 stripes from the RSDT, in which the missing page is not a parity page.
For each selected stripe, recalculate the missing page using "degraded read" into NVRAM cache 46 (including updating the RPD of the page using CAS to point to the NVRAM cache).
Destage the N−1 recalculated pages in a new stripe of width N−1.

Phase 2:
Select N−1 stripes from the RSDT.
For each selected stripe:
Read the degraded page.
Read the existing parity pages (that were calculated including the page stored on the unavailable storage device) and calculate new parity pages (excluding the page stored on the unavailable storage device).
Allocate two new pages on the storage devices of the new parity pages.
Destage new parity pages to the new locations.
Allocate and write new RSD, indicating the new RAID scheme having a stripe width of N−1.
RDMA write the RPD ID to the server-specific potentially-dirty RPD list.
Update all RPDs using CAS.
In case of CAS failure (indicative of collision), abort the transaction (including reverting to the previous RPDs using CAS) and retry.

Following Phase 2, after a time-out, the processor typically performs garbage collection on the released parity locations and RSDs.

In an embodiment, the processor may avoid the "degraded read" at the beginning of Phase 2 by reading the missing data pages directly, using the RPDs created for these pages in Phase 1. This technique requires additional metadata for ensuring that the RPD was not overwritten since it was written in Phase 1. In an example implementation, the processor may store a respective index in the RSDT for each such RPD while performing Phase 1. These indices can then be used during Phase 2 to verify the RPDs. Volatile storage may be used for storing this temporary data structure.

The example re-distribution and rebuilding processes described above are depicted purely for the sake of conceptual clarity. In alternative embodiments, any other suitable process can be used. In some embodiments, the disclosed re-distribution and/or rebuilding processes can be combined with the garbage collection process, thereby increasing efficiency. In other embodiments, re-distribution and rebuilding are carried out separately from garbage collection.

Recovery from Server Failure ("Write Hole")

In some embodiments, storage controllers 36 recover from "write hole" scenarios in which a certain server 24 fails during a write operation. One major "write hole" scenario, although not the only scenario, occurs when a server fails between RPD CAS updates. A server 24 that fails after performing some of the CAS operations leaves the data structures of system 20 in an inconsistent state. Since a server typically transfers all CAS operations to the RDMA NIC in parallel, this scenario is highly unlikely. A scenario of a server failing after sending the CAS operations, but before detecting that one or more of the CAS operations has failed, is more likely. In any of these scenarios, some of the RPDs are left pointing to resident caches and a non-full stripe on the storage devices which will later be garbage collected (using the potentially-dirty RPD list).

Typically, storage controllers 36 are responsible for destaging pages of a failed server that are cached in NVRAM cache 46, and for releasing any other remaining resources. Storage controllers 36 are also responsible for scrubbing the two copies of all NVRAM data structures to resolve inconsistencies. Servers 24 may assist the storage controllers in performing this process by writing cyclic hint logs containing the entries that are not confirmed to be consistently written in two copies.

Garbage Collection and Compaction

In some embodiments, storage controllers 36 carry out garbage collection processes and/or other background tasks. In some embodiments these tasks are distributed to servers 24. The description that follows refers to "a processor" that performs these tasks. This processor may comprise, for example, the CPU of a storage controller 36 or of a server 24.

In an embodiment, the processor performs garbage collection for obsolete data pages on storage devices 28. As described above, write commands that update RPDs that already reside on the storage devices are initially cached in NVRAM cache 46, and later destaged to new storage locations on the storage devices. The previous, invalid versions of these pages should be identified and discarded, and their storage locations released for storing new data.

In some embodiments, the processor performs this garbage collection process by identifying mismatches between the RSDT and the RPDT (see FIG. 3). As explained above, each RPD in the RPDT specifies the storage location of the data page, and each RSD in the RSDT specifies the RPDs and storage locations of the pages in the stripe. If, for a certain RPD ID, the RPDT and the RSDT specify different storage locations, then the storage device page specified in the RSDT is invalid and should be garbage-collected. In some embodiments, the processor crawls or otherwise searches the RSDT for such mismatches. In some embodiments, agents 40 may provide the processor hints that improve the efficiency of the garbage collection process. One such hinting mechanism is the server-specific potentially-dirty list described above.

In some embodiments, during or following the garbage collection process, the processor compacts the stripes in which invalid pages have been discarded. The compaction process is similar to the re-distribution process described above—The processor reads incomplete stripes to NVRAM cache 46, and writes the data pages into other incomplete stripes. In an embodiment, the processor prefers to compact stripes with the largest number of invalid pages.

In some embodiments, the processor performs garbage collection and compaction on multiple stripes simultaneously in order to reduce the amount of actual data movement. Nevertheless, whenever data is added to a stripe, the parity pages are recalculated and written to a new location, allowing degraded read operations to complete successfully.

Consider, for example, a RAID-6 scheme in which each stripe has eight data pages and two parity pages. Consider the following three stripes (in which d denotes data pages, p and q denote parity pages, and X denotes an invalid page):

| 00 | 01 | 02 | 03 |    |    | 06 | 08 | 09 |
|----|----|----|----|----|----|----|----|----|
|    |    | 12 | 13 | 14 | 15 |    |    |    |
| 21 | 21 |    |    |    |    |    |    | 29 |

When performing garbage collection and compaction on multiple stripes simultaneously, the processor is able to compact these three stripes into the following single stripe without any data movement:

| 00 | 01 | 02 | 03 | 14 | 15 | 06 | 29 |
|----|----|----|----|----|----|----|----|

The parity pages p and q of the newly-created stripe are recalculated over the data pages collected from the three incomplete stripes.

In some embodiments the processor prefers to write combined stripes to new locations, so that the underlying storage media performs sequential writes rather than random writes.

In some embodiments, the processor releases RSDs as part of the garbage collection process. To allow for RSDT paging, allocated RSDs are typically compacted together. The processor typically moves an RSD by first copying the RSD, and then updating all the RPDs pointing to the RSD using CAS. Alternatively, the processor may employ another level of indirection, which is not pageable and indexes the RSDT per stripe. In this solution, moving an RSD can be performed by a single RDMA write operation of such an index.

In some embodiments, as part of the garbage collection process, the processor allocates and periodically sends to servers 24 lists of (i) available free RSDs and (ii) available free storage pages (preferably contiguous) on storage devices 28.

Paging-Out of RSDT

In some embodiments, storage controllers 36 may page-out parts of the RSDT from memory to storage devices 28. If paging is enabled, the RSDT itself it typically over-provisioned to allow for simpler and more efficient garbage collection. In some embodiments, the processor may page-out the RSDT to an area in the RBA address space in which a simpler RAID scheme is used (e.g., mirroring as opposed to RAID-6 exposed to the user volume layer). In other embodiments, the processor may page-out the RSDT using the same RAID scheme used for user volumes, to an area of the RBA address space for which the relevant RSDs cannot be paged out. The paging granularity should typically be the stripe width of the underlying RAID scheme or some integer multiple thereof.

Optimizations for Large Write-Command Sizes

In some embodiments, system 20 supports write commands ("I/Os") having multiple possible sizes simultaneously. For example, some workloads may use 4 KB write commands (i.e., write data pages of 4 KB size), whereas other workloads may use 32 KB write commands (i.e., write data pages of 32 KB size). Other page sizes are also possible.

In one embodiment, storage controllers 36 create multiple RAID areas with different block sizes, such that the layers above (e.g., user volume layer 52 and volume map 60) allocate volumes in the different RAID areas based on configuration or per-I/O, depending on I/O size. The latter scheme typically requires address virtualization at the volume map level, and may increase fragmentation at that level.

In an alternative embodiment, the storage controllers may group multiple RPDs into larger "compound RPDs." For example, multiple 4 KB RPDs can be grouped and stored as 32 KB compound RPD. The sizes of the RPDs and compound RPDs are given purely by way of example. Moreover, the system may use two or more sizes of compound RPD concurrently.

Let CP denote the size of a compound page (32 KB in the present example). A compound RPD is defined as a collection of RPDs starting at an address aligned to CP and containing multiple RPDs (eight 4 KB RPDs in the present example). When a write of size CP (or larger) arrives, the storage process is the same as for a small block write, except that a CP size page is allocated in the server-specific NVRAM cache area for each such write. Instead of updating a single RPD using CAS, all the RPDs in the compound page are updated using CAS, while also marking them as compound. If several compound page sizes are supported, then this marker should also specify the compound page size. Destaging of compound pages is similar to destaging of individual pages, with the exception that the RSD should also be marked appropriately—effectively creating a stripe with CP-size blocks. A buddy allocator may be used for NVRAM cache pages of different sizes.

In an alternative embodiment, compound RPDs may be implemented by adding a second level of indirection, creating a page-table hierarchy of RPDs. For example, 32 KB page descriptors can be used in the first level and 4 KB pages in the second level. This solution reduces the number of CAS operations, at the expense of larger memory usage and an added roundtrip delay.

Mitigating Double Network Traffic on Write

Consider an embodiment of system 20 in which storage devices 28 are connected directly to the two storage controllers 36, e.g., by a point-to-point connection or a fast private network. The two storage controllers nevertheless form two different failure domains. In the proposed design, every written page needs to be first written using RDMA to two NVRAM cache locations in two different failure domains, thereby doubling the server's network bandwidth and I/O rate for write commands.

One possible way to reduce the server bandwidth and I/O rate is to write the page to a single copy in a single NVRAM cache location, and additionally back-up the page on a single storage device 28. The NVRAM storage location and the storage device should be chosen in different failure domains.

Unless the page is overwritten before a stripe is available for destaging, the initial storage location on the storage device will also be the final storage location, so as not to create excess write amplification. The storage device is typically chosen according to the RSD slot for the write command.

Thin Provisioning and Over-Provisioning

The virtualization layer provided by the RPDT allows for a simple implementation of thin-provisioning at page granularity, since actual storage space on storage devices 28 is only allocated when a stripe is destaged. This implementation may come at the expense of increasing the size of the RPDT to cover the entire thinly-provisioned virtual capacity. This increase can be mitigated by implementing coarse-granularity block thin-provisioning at the volume map level, combined with fine-granularity thin provisioning at the RPDT level.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for data storage, comprising:
in a system that comprises at least a storage controller, multiple servers and multiple multi-queue storage devices that communicate over a network, maintaining in a memory of the storage controller a data structure, which is shared among the servers and modified by the servers using remote direct memory access to the memory of the storage controller, and which specifies storage addresses of data blocks accessed by the servers;
sending a plurality of the data blocks from a server to a Non-Volatile Random-Access Memory (NVRAM) cache using remote direct memory access, so as to accumulate one or more stripes of the data blocks in the NVRAM cache;
transferring the stripes from the NVRAM cache to respective server-specific queues on the storage devices; and
preventing other servers from causing inconsistency in the data blocks during accumulation of the data blocks in the NVRAM cache or during transferal of the stripes from the NVRAM cache to the storage devices, by querying the data structure over the network using the remote direct memory access and verifying that, in accordance with the data structure, the storage addresses of the data blocks were not modified by another server during the accumulation of the data blocks or during the transferal of the stripes.

2. The method according to claim 1, wherein sending the data blocks, transferring the stripes and preventing the inconsistency are performed without obtaining a lock on any of the data blocks.

3. The method according to claim 1, wherein preventing the inconsistency comprises:

before writing a data block to the NVRAM cache, obtaining a storage address of the data block by making a first query to the shared data structure using remote direct memory readout;
after writing the data block and before updating the shared data structure, making a second query to the shared data structure using remote direct memory readout, so as to re-obtain the storage address of the data block; and
aborting writing of the data block if the storage address differs between the first and second queries.

4. The method according to claim 3, wherein making the second query and updating the shared data structure are performed jointly in an atomic compare-and-swap (CAS) remote direct memory access write command.

5. The method according to claim 1, wherein preventing the inconsistency comprises, after transferring at least part of a stripe from the NVRAM cache to the storage devices and before updating the shared data structure, verifying that the storage addresses of one or more of the data blocks in the stripe did not change during the transferal of the stripe.

6. The method according to claim 5, wherein verifying the storage addresses and updating the shared data structure are performed jointly in one or more atomic compare-and-swap (CAS) remote direct memory access write commands.

7. The method according to claim 1, and comprising reading a data block from the NVRAM cache or from the storage devices, by:
before reading the data block, making a first query to the shared data structure using remote direct memory readout, so as to obtain a storage address of the data block;
after reading the data block, making a second query to the shared data structure using remote direct memory readout, so as to re-obtain the storage address of the data block; and
outputting the read data block only if the storage address of the data block is unchanged between the first and second queries.

8. The method according to claim 1, wherein preventing the inconsistency is performed without executing code on a processor of the storage controller.

9. The method according to claim 1, wherein preventing the inconsistency is performed without direct communication among the servers.

10. The method according to claim 1, wherein sending the data blocks and transferring the stripes comprise accumulating the data blocks until filling a predefined integer number of stripes, and then transferring the predefined integer number of stripes to the storage devices.

11. The method according to claim 1, wherein at least part of the data structure is paged-out to the storage devices, and comprising identifying the paged-out part, and a storage address thereof, by the servers using remote direct memory access, and then accessing the identified paged-out part on the storage devices.

12. The method according to claim 1, and comprising read-caching in the NVRAM cache data that is read by the server from the storage devices.

13. A computing system, comprising:
multiple servers;
a storage controller, configured to maintain in a memory thereof a data structure, which is shared among the servers and modified by the servers using remote direct memory access to the memory of the storage controller, and which specifies storage addresses of data blocks accessed by the servers; and multiple multi-queue storage devices,
wherein the servers are configured to communicate with the storage controller and the storage devices over a network, and wherein a server among the servers is configured to:
  send a plurality of the data blocks to a Non-Volatile Random-Access Memory (NVRAM) cache using remote direct memory access, so as to accumulate one or more stripes of the data blocks in the NVRAM cache;
  transfer the stripes from the NVRAM cache to respective server-specific queues on the storage devices; and
  prevent another servers from causing inconsistency in the data blocks during accumulation of the data blocks in the NVRAM cache or during transferal of the stripes from the NVRAM cache to the storage devices, by querying the data structure over the network using the remote direct memory access and verifying that, in accordance with the data structure, the storage addresses of the data blocks were not modified by another server during the accumulation of the data blocks or during the transferal of the stripes.

14. The computing system according to claim 13, wherein the server is configured to send the data blocks, transfer the stripes and prevent the inconsistency without obtaining a lock on any of the data blocks.

15. The computing system according to claim 13, wherein the server is configured to prevent the inconsistency by:
  before writing a data block to the NVRAM cache, obtaining a storage address of the data block by making a first query to the shared data structure using remote direct memory readout;
  after writing the data block and before updating the shared data structure, making a second query to the shared data structure using remote direct memory readout, so as to re-obtain the storage address of the data block; and
  aborting writing of the data block if the storage address differs between the first and second queries.

16. The computing system according to claim 15, wherein the server is configured to make the second query and update the shared data structure jointly in an atomic compare-and-swap (CAS) remote direct memory access write command.

17. The computing system according to claim 13, wherein the server is configured to prevent the inconsistency by, after transferring at least part of a stripe from the NVRAM cache to the storage devices and before updating the shared data structure, verifying that the storage addresses of one or more of the data blocks in the stripe did not change during the transferal of the stripe.

18. The computing system according to claim 17, wherein the server is configured to verify the storage addresses and update the shared data structure jointly in one or more atomic compare-and-swap (CAS) remote direct memory access write commands.

19. The computing system according to claim 13, wherein the server is configured to read a data block from the NVRAM cache or from the storage devices, by:
  before reading the data block, making a first query to the shared data structure using remote direct memory readout, so as to obtain a storage address of the data block;
  after reading the data block, making a second query to the shared data structure using remote direct memory readout, so as to re-obtain the storage address of the data block; and
  outputting the read data block only if the storage address of the data block is unchanged between the first and second queries.

20. The computing system according to claim 13, wherein the server is configured to prevent the inconsistency without executing code on a processor of the storage controller.

21. The computing system according to claim 13, wherein the server is configured to prevent the inconsistency without direct communication with any other of the servers.

22. The computing system according to claim 13, wherein the server is configured to send the data blocks until filling a predefined integer number of stripes, and then transfer the predefined integer number of stripes to the storage devices.

23. The computing system according to claim 13, wherein at least part of the data structure is paged-out to the storage devices, and wherein the server is configured to identify the paged-out part, and a storage address thereof, using remote direct memory access, and then access the identified paged-out part on the storage devices.

24. The computing system according to claim 13, wherein the server is configured to read-cache in the NVRAM cache data that is read by the server from the storage devices.

25. A server in a system that comprises multiple servers, the server comprising:
  a network interface for communicating over a network with multiple multi-queue storage devices and with a storage controller, wherein the storage controller maintains in a memory thereof a data structure, which is shared among the servers and modified by the servers using remote direct memory access to the memory of the storage controller, and which specifies storage addresses of data blocks accessed by the servers; and
  a processor, which is configured to:
    send a plurality of the data blocks to a Non-Volatile Random-Access Memory (NVRAM) cache using remote direct memory access, so as to accumulate one or more stripes of the data blocks in the NVRAM cache;
    transfer the stripes from the NVRAM cache to respective server-specific queues on the storage devices; and
    prevent other servers from causing inconsistency in the data blocks during accumulation of the data blocks in the NVRAM cache or during transferal of the stripes from the NVRAM cache to the storage devices, by querying data structure over the network using the remote direct memory access and verifying that, in accordance with the data structure, the storage addresses of the data blocks were not modified by another server during the accumulation of the data blocks or during the transferal of the stripes.

* * * * *